United States Patent Office 2,716,105
Patented Aug. 23, 1955

2,716,105

MULTICOMPONENT INTERPOLYMERS OF VINYLIDENE CYANIDE

Harry Gilbert, Cuyahoga Falls, and Floyd F. Miller, Wadsworth, Ohio, assignors to The B. F. Goodrich Company, New York, N. Y., a corporation of New York No Drawing. Application January 26, 1952,
Serial No. 268,462

20 Claims. (Cl. 260—78.5)

This invention relates to novel multicomponent polymers and methods for the preparation thereof, and pertains more particularly to interpolymers of vinylidene cyanide with a conjugated aliphatic diene and at least one monoolefinic monomer, which interpolymers are extremely valuable synthetic resins, being especially useful in the preparation of filaments, films and the like.

Monomeric vinylidene cyanide is a clear liquid at room temperature and a crystalline solid at 0° C. It melts in the range 6.0° C. to 9.7° C. depending on purity, with purest samples melting at 9.0° C. to 9.7° C., and it boils at 40° C. at a reduced pressure of 5 mm. of mercury. The monomer is quite sensitive to water, undergoing on contact therewith at room temperature an instantaneous homopolymerization reaction to give a solid, water insoluble resin. Methods for the preparation of monomeric vinylidene cyanide are disclosed in U. S. Patents 2,476,270, 2,502,412 and 2,514,387.

In copending applications, Serial Nos. 159,146 and 159,147, filed April 29, 1950, it is disclosed that monomeric vinylidene cyanide possessing the above properties polymerizes readily with aliphatic conjugated dienes to give hard, horny, resinous, non-rubbery two component copolymers. Such copolymers are further unique in that they are essentially 1:1 alternating copolymers, that is, copolymers possessing the structure:

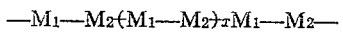

wherein each $M_1$ is a vinylidene cyanide unit

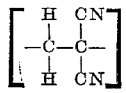

each $M_2$ is a unit of an aliphatic conjugated diene, and $x$ is a polydigit number. The fact the copolymers thus obtained are essentially 1:1 alternating copolymers is determined by nitrogen analysis of the copolymer which shows that the two monomers enter the polymer chain in essentially equimolar ratios regardless of the degree of monomer to polymer conversion and of charging ratio. Further supporting evidence for this fact is found in the copolymerization equation of F. M. Lewis, C. Walling et al., Journal of the American Chemical Society volume 70, page 1519 (1948):

$$\frac{d[M_1]}{d[M_2]}=\frac{[M_1]}{[M_2]}\cdot\frac{r_1[M_1]+[M_2]}{r_2[M_2]+[M_1]}$$

wherein:

$M_1$=concentration of unreacted monomer $M_1$
$M_2$=concentration of unreacted monomer $M_2$
$r_1$=ratio of the rate constants for the reaction of an $M_1$ type radical with $M_1$ and $M_2$ respectively
$r_2$=ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to 0, a 1:1 alternating copolymer is formed, that is, a copolymer having the

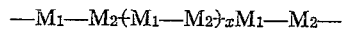

structure shown hereinabove. It has been found that the product of $r_1$ and $r_2$ as calculated for copolymers of vinylidene cyanide with aliphatic conjugated dienes is substantially 0, so that the equation clearly indicates that an essentially 1:1 alternating copolymer is formed. Moreover, certain other monomeric materials also form the unique 1:1 alternating copolymers with vinylidene cyanide, as will be further explained hereinbelow.

However, while useful filaments, films and other shaped articles can be prepared from two component copolymers of vinylidene cyanide and aliphatic conjugated dienes, said copolymers possess properties which in some applications are undesirable. For example, the two component copolymers of vinylidene cyanide with dienes generally are very high melting, have a relatively short melt life, and are insoluble in a great many common solvents, so that difficulty is encountered in fabricating such copolymers into filaments, films and the like. Also, the two component copolymers of vinylidene cyanide with dienes possess an extreme degree of crystallinity, a property which in itself is desirable in many applications, but which in applications such as injection molding is undesirable in that only opaque products can be obtained when very highly crystalline polymers are molded.

Accordingly, it is an object of the present invention to modify the properties obtained in two component copolymers of vinylidene cyanide with dienes so that the resulting materials may be easily fabricated into filaments, films and other shaped articles.

Another object of this invention is to provide interpolymers containing vinylidene cyanide, a conjugated aliphatic diene and one or more other monoolefinic monomers, which interpolymers can be readily melt spun, cast or molded.

It is still another object of this invention to polymerize vinylidene cyanide and a conjugated aliphatic diene with a third monoolefinic monomer in such a way that the resulting interpolymer will be more soluble in common solvents, have a lower melt point and a longer melt life than a two component copolymer of vinylidene cyanide with a diene. Other objects will be apparent from the description which follows.

It has now been discovered that the above and other objects are readily attained by polymerizing vinylidene cyanide and an aliphatic conjugated diene with at least one other monomer which is a monoolefinic compound copolymerizable with vinylidene cyanide. Preferably, said monomer is a compound wherein the carbon to carbon unsaturation consists in a terminal methylene ($CH_2$), joined by an ethylenic double bond to its adjacent carbon atom, that is, having a single $CH_2=C<$ group.

Compounds of the above type which copolymerize with vinylidene cyanide and which form useful interpolymers with vinylidene cyanide and an aliphatic conjugated diene in accordance with this invention include the following:

Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene and the like;

Many of the hydrocarbons listed hereinabove, including for example, styrene and the alpha substituted styrenes, isobutylene and other olefins of the formula

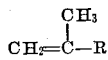

wherein R is an alkyl radical containing from 1 to 6 carbon atoms, form the unique 1:1 alternating copolymers with vinylidene cyanide;

Halogenated monoolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloro-monofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), 1,1,2-trichloroethylene bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene and the like; among the above disclosed halogenated hydrocarbons which polymerize with vinylidene cyanide to give essentially 1:1 alternating copolymers are included the halogenated styrenes such as alpha-chlorostyrene, 2,5-dichlorostyrene and the like, vinyl and vinylidene halides such as vinyl chloride and vinylidene chloride, and 2-halogenated monoolefins such as 2-chloropropene, 2-fluorohexene, 2-chloroheptene and the like;

Monoolefinically unsaturated esters such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

Many of the esters listed in the foregoing paragraphs form 1:1 alternating copolymers with vinylidene cyanide; included among these esters are vinyl acetate, vinyl benzoate and other vinyl esters of monocarboxylic acids such as vinyl alpha-chloroacetate, esters of methacrylic acid such as methyl methacrylate and butyl methacrylate, and isopropenyl esters of organic monocarboxylic acids such as isopropenyl acetate and isopropenyl isobutyrate;

Monoolefinically unsaturated organic nitriles such as acrylonitrile, methacrylonitrile, ethacrylonitrile, 1,1-dicyano propene-1 3-octenenitrile, crotonitrile, oleonitrile, and the like;

Monoolefinically unsaturated carboxylic acids such as acrylic acid, methacrylic acid, crotonic acid, 3-butenoic acid, angelic acid, tiglic acid and the like.

Other polymerizable monoolefinic monomers may also be polymerized with vinylidene cyanide and an aliphatic conjugated diene to form the interpolymers of the present invention. Consequently this invention includes within its scope interpolymers of (1) vinylidene cyanide, (2) an aliphatic conjugated diene and (3) any monoolefinic monomer copolymerizable with vinylidene cyanide. An especially preferred class of third monomers are those which when admixed with vinylidene cyanide in a two component monomer system form therewith an essentially 1:1 alternating two component copolymer.

Any aliphatic conjugated diene may be utilized in preparing the interpolymers of this invention. Included within this class of compounds are butadiene-1,3, which is especially preferred because of its low cost and availability, 2-methyl butadiene-1,3, piperylene, 2,3-dimethyl butadiene-1,3, 1,2-dimethyl butadiene-1,3, 1,3-dimethyl butadiene-1,3, 1-ethyl butadiene-1,3, 1,4-dimethyl butadiene-1,3, 2-neopentyl butadiene-1,3, 2-methyl pentadiene-1,3, 2-chloro-butadiene-1,3, 2-bromo-butadiene-1,3, 2-iodo-butadiene-1,3, 2-chloro-3-methyl-butadiene-1,3, 2-bromo-3-methyl-butadiene-1,3, 1-bromo-2-methyl butadiene-1,3, 2-iodo-3-methyl-butadiene-1,3, 1-fluoro-2-methyl-butadiene-1,3, and the like.

The respective quantities of diene and the monoolefinic monomers in the polymers of the present invention may be varied widely while still obtaining interpolymers which possess useful properties not possessed by two component copolymers of vinylidene cyanide with dienes. For example, tripolymers containing as little as 2 mole per cent of a third monomer possess softening points markedly lower than dual copolymers of vinylidene cyanide with dienes and additionally are less crystalline than said copolymers. Moreover, tripolymers containing as much as 50 mole per cent of the third monomer and as little as 1 mole per cent of the conjugated diene are also included within the scope of the present invention and possess properties distinct from those of two component copolymers of vinylidene cyanide with the dienes. In all of the interpolymers of the present invention the vinylidene cyanide is present in the polymer in substantially 50 mole per cent, regardless of the quantity of vinylidene cyanide monomer charged. The quantity of the conjugated diene and the third monomer introduced into the polymer chain can be accurately controlled, however, simply by varying the charging ratio of the latter two monomers. To illustrate, the examples hereinbelow show that the dienes may be charged in an amount as small as 0.37 mole or as high as 3.2 moles for each mole of vinylidene cyanide, while the third monomer may be charged in an amount as small as 0.06 mole or as high as 18.3 moles for each mole of vinylidene cyanide. Moreover, both the diene and the third monoolefinic monomer may be charged in even smaller or larger quantities than shown in the specific examples and the interpolymers obtained will differ in properties from two component copolymers of vinylidene cyanide with the dienes. It is to be understood, of course, that the amount of the third monomer to be charged in any given polymerization will vary according to the ease with which said monomer enters the polymer chain. Thus, with those monomers which enter the polymer chain slowly, for example, vinyl esters of aliphatic monocarboxylic acids such as vinyl acetate and the like, it is necessary to charge relatively large amounts of the monomer in order to introduce small amounts into the polymer chain. Other monomers, such as styrene and substituted styrenes, however, enter the polymer chain very readily, and only small amounts of such monomers need be charged in order to introduce appreciable amounts into the polymer.

It is disclosed in the copending applications referred to hereinabove that vinylidene cyanide reacts quite readily with conjugated dienes to form a Diels-Alder type adduct and that this reaction competes strongly with the copolymerization of vinylidene cyanide with the dienes. It is also disclosed in said copending applications that vinylidene cyanide polymerizes ionically in the presence of a number of substances which provide ions, for example, water, alcohol, esters, ketones and the like to form a homopolymer which is of low molecular weight (below 25,000) and of little practical value. Therefore, in preparing the interpolymers of the present invention care must be taken to prevent entirely or reduce to a minimum the two competing side reactions. This is best accomplished by carrying out the polymerization in a single phase system and in the presence of a very active free radical polymerization catalyst. In this manner both the tendency for adduct formation and for ionic homopolymerization of the vinylidene cyanide to occur are greatly repressed and high conversions of monomer to polymer are secured.

Preferably, the monomers are first dissolved in a liquid aromatic hydrocarbon such as benzene and halogenated benzenes, which are especially preferred, toluene, methyl toluene or the like, desirably in an amount such that the solvent comprises from 50 to 80% or more by weight of the total solution. A free radical polymerization catalyst is added to the solution and the resulting mixture heated to a temperature of from —15° to 100° C., preferably at 20° C. to 60° C., whereupon polymerization occurs to form the desired interpolymer as a white powder of small particle size, the polymerization requiring approximately 1 to 24 hours in most instances. The interpolymer thus formed may be separated from the polymerization medium simply by filtering, or if desired the polymerization medium can be separated from the polymer and recovered by distillation.

A second method of polymerization, less desirable than the above method, but which may be successfully utilized, consists in agitating the monomers in a liquid aliphatic hydrocarbon (in which vinylidene cyanide monomer is only very slightly soluble), for example, hexane or heptane, and heating in the presence of a free radical polymerization catalyst whereupon the interpolymer forms and may be separated from the polymerization medium by filtering or by other conventional separation means.

An alternative method of polymerization, especially useful in the preparation of tripolymers of vinylidene cyanide, a diene and a vinyl ester, consists in utilizing large amounts of the vinyl ester as a solvent-diluent for the other monomers, thus providing a dilution effect which does not favor Diels-Alder adduct formation. The use of large quantities of the vinyl ester is not objectionable since as stated hereinabove only relatively small amounts of the vinyl ester enter the polymer chain even though large quantities of the ester are charged.

The polymerization may also be carried out on a continuous basis simply by adding, continuously or intermittently, fresh quantities of the monomers, and also of catalyst and solvent or diluent, if desired, to the polymerization mixture during the course of the polymerization.

The catalyst utilized in preparing the interpolymers of the present invention are those which form free radicals at the polymerization temperature, and particularly those which are very active free radical type materials, since it is important that the polymerization proceed as rapidly as possible in order that adduct formation between the vinylidene cyanide and diene can not take place to an appreciable extent. Particularly useful catalysts of this type include the combination of sulfur dioxide with an organic mercaptan as disclosed in a copending application, Serial No. 346,041, filed March 31, 1953, or the combination of an inorganic acid with an organic thiol (mercaptan) such as methanethiol, 1-butanethiol, toluenethiol, and the like, the latter catalyst combination being disclosed in another copending application, Serial No. 346,042, filed March 31, 1953.

Another class of catalysts useful in preparing interpolymers of vinylidene cyanide, a conjugate diene and a third monoolefinic monomer comprises compounds of the structure

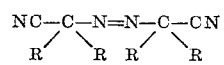

wherein each R is a hydrocarbon radical. Examples of compounds of this class include alpha, alpha'-azodiisobutyronitrile, alpha, alpha'-azobis(alpha, beta-dimethylbutyronitrile), alpha, alpha'-azobis(alpha-cyclopropionitrile), and the like. The use of this type of catalyst in preparing polymers of vinylidene cyanide is disclosed in copending application, Serial No. 228,562, filed May 17, 1952. Diazo compounds other than those which possess the above structure are not useful in the polymerization process as they initiate the ionic homopolymerization of the vinylidene cyanide monomer to the extent that none of the desired interpolymer is obtained.

Other catalysts which are useful in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like.

The amount of catalyst utilized is not critical and may be varied widely. In general, however, from 0.01 to 5% by weight (based on the total weight of monomers charged) of the catalyst is utilized.

The following examples illustrate more fully the preparation of interpolymers comprising vinylidene cyanide, a conjugated diene and one or more monoolefinic monomers. The examples are not, however, to be construed as a limitation upon the scope of the invention, for there are, of course, numerous possible variations and modifications in the procedures described. In the examples all parts are by weight.

EXAMPLES I TO III

A series of tripolymers of vinylidene cyanide, butadiene-1,3 and o-chlorostyrene is prepared by dissolving the monomers in benzene, adding o,o'-dichlorobenzoyl peroxide as a polymerization catalyst, and heating the resulting mixture at a temperature of 40° C. whereupon polymerization occurs to form the tripolymer which is recovered from the polymerization medium by filtering. The monomer charging rates, tripolymer analysis and other pertinent data are recorded in Table 1.

EXAMPLES IX TO XI

Three tripolymers of vinylidene cyanide, butadiene-1,3 and isobutylene are prepared utilizing various monomer charging ratios. The polymerization recipes and other pertinent data are recorded in Table 3.

*Table 3*

| Example | IX | X | XI |
|---|---|---|---|
| Parts vinylidene cyanide charge | 22.0 | 19.5 | 19.5 |
| Parts butadien-1,3 charged | 33.0 | 13.7 | 5.05 |
| Parts isobutylene charged | 6.3 | 14.2 | 26.0 |
| Molar charging ratio: Vinylidene cyanide/butadiene-1,3/isobutylene | 1/2.15/0.4 | 1/1/1 | 1/0.37/1.86 |
| Volume percent benzene charged | 70 | 85 | 85 |
| Parts catalyst [1] | 0.5 | 0.5 | 0.5 |
| Polymerization temperature | 40 | 40 | 40 |
| Polymerization time | 1½ | 2 | 1½ |
| Softening temperature of tripolymer (° C.) | 250–255 | 210–220 | 140–160 |

[1] o,o'-Dichlorobenzoyl peroxide.

*Table 1*

| Example | I | II | III |
|---|---|---|---|
| Parts vinylidene cyanide charged | 14.6 | 14.6 | 14.6 |
| Moles vinylidene cyanide charged | 0.187 | 0.187 | 0.187 |
| Parts Butadiene-1,3 charged | 10.8 | 10.8 | 10.8 |
| Moles Butadiene-1,3 charged | 0.2 | 0.2 | 0.2 |
| Parts o-chlorostyrene charged | 0.0 | 23.6 | 47.2 |
| Moles o-chlorostyrene charged | 0.0 | 0.2 | 0.4 |
| Molar charging ratio: vinylidene cyanide/butadiene-1,3/o-chlorostyrene | 1/1/0 | 1/1/1 | 1/1/2 |
| Volume percent benzene charged | 80 | 65 | 55 |
| Polymerization time (hours) | 5 | 2 | 2 |
| Weight percent Cl in polymer | 0.0 | 5.23 | 7.3 |
| Weight percent N in polymer | 20.6 | 18.4 | 17.4 |
| Mole percent vinylidene cyanide in polymer | 48.3 | 49.4 | 49.6 |
| Mole percent butadiene-1,3 in polymer | 51.7 | 39.5 | 34.0 |
| Mole percent o-chlorostyrene in polymer | 0.0 | 11.1 | 16.4 |

The polymer of Example I melts at 270° C. but does not flow readily even at 300° C. The polymer of Example II softens at 150° C. to 170° C. and is melt spun into monofilaments which can be cold drawn to improve their physical properties. The polymer of Example III softens at 130°–140° C. and is also spun into monofilaments which can be cold drawn. The polymer of Example I is not soluble in hot dimethyl formamide, but the polymers of Examples II and III are slightly soluble in dimethyl formamide at 150° C.

EXAMPLES IV TO VIII

A series of tripolymers of vinylidene cyanide, butadiene-1,3 and styrene are prepared according to the method of Examples I to III. The pertinent data are tabulated below:

*Table 2*

| Example | IV | V | VI | VII | VIII |
|---|---|---|---|---|---|
| Moles vinylidene cyanide charged | 1.11 | 0.217 | 0.0187 | 0.05 | 0.00625 |
| Moles butadiene charged | 1.25 | 0.346 | 0.05 | 0.05 | 0.01 |
| Moles styrene charged | 0.835 | 0.12 | 0.05 | 0.05 | 0.0895 |
| Molar charging ratio: Vinylidene cyanide/butadiene-1,3/styrene | 1/1.12/0.75 | 1/1.09/0.38 | 1/2.7/2.7 | 1/1/1 | 1/1.6/14.3 |
| Volume percent benzene | 70 | 70 | 82 | 80 | 94 |
| Parts catalyst | 0.28 | 0.28 | 0 | 0 | 0 |
| Polymerization temperature | 40 | 40 | 23 | 23 | 23 |
| Polymerization time | 22 min | 38 min | 18½ hrs | 18½ hrs | 18½ hrs |
| Percent nitrogen in polymer | 18.56 | 19.9 | 18.78 | 18.42 | 15.62 |
| Percent vinylidene cyanide in polymer | 50 | 50 | 50 | 50 | 50 |
| Percent butadiene-1,3 in polymer | 32 | 42 | 34 | 31 | 1 |
| Percent styrene in polymer | 18 | 8 | 16 | 19 | 49 |

The polymer of Example IV is soluble in dimethyl formamide and is molded into sheets which are cold drawn to give highly oriented films that give excellent crystalline X-ray patterns. Also, the polymer can be milled at about 150° C. to give tough sheets.

The polymers of Examples V to VIII are also suitable for the preparation of oriented filaments and films. The polymer of Example VI softens at 170°–180° C., the polymer of Example VII at 195°–210° C. and the polymer of Example VIII at 180°–200° C.

It will be noted that as the amount of isobutylene is increased the softening point of the tripolymer is lowered. Each of the tripolymers is melt-spinnable and can be pressed into thin films which when cold drawn give excellent crystalline X-ray patterns.

EXAMPLES XII TO XV

A series of tripolymers of vinylidene cyanide, butadiene-1,3 and vinylidene chloride are prepared dissolving varying amounts of the monomers in benzene, adding 0.15% by weight (based on the total monomer weight) of o,o'-dichlorobenzoyl peroxide and heating the resulting mixtures to a temperature of 40° C. whereupon polymerization occurs to form the desired tripolymer. Table 4 contains the charging ratios and tripolymer analysis.

*Table 4*

| Example | XII | XIII | XIV | XV |
|---|---|---|---|---|
| Mole percent vinylidene cyanide in charge | 22.05 | 15.05 | 50.00 | 9.98 |
| Mole percent butadiene-1,3 in charge | 45.95 | 63.25 | 20.80 | 20.02 |
| Mole percent vinylidene chloride in charge | 32.00 | 21.70 | 29.20 | 70.00 |
| Mole percent vinylidene cyanide in polymer | 46.16 | 46.98 | 46.10 | 45.64 |
| Mole percent butadiene-1,3 in polymer | 51.61 | 51.67 | 50.16 | 50.46 |
| Mole percent vinylidene chloride in polymer | 2.23 | 1.35 | 3.74 | 3.90 |

The polymers of Examples XII to XV are spongy, leathery materials which are extremely insensitive to acids and alkalis.

EXAMPLES XVI TO XX

A series of tripolymers of vinylidene cyanide, chloroprene and styrene are prepared in benzene at 40° C., the monomer charging ratio being varied in each example. The polymerization recipes and tripolymer analysis are recorded in Table 5.

Table 5

| Example | XVI | XVII | XVIII | XIX | XX |
|---|---|---|---|---|---|
| Mole percent vinylidene cyanide charged | 47.0 | 44.6 | 41.5 | 37.2 | 35.7 |
| Mole percent chloroprene charged | 53.0 | 50.1 | 46.6 | 41.8 | 37.8 |
| Mole percent styrene charged | 0.0 | 5.2 | 11.9 | 21.0 | 28.5 |
| Mole percent vinylidene cyanide in polymer | 49.0 | 49.4 | 49.0 | 48.4 | 48.3 |
| Mole percent chloroprene in polymer | 51.0 | 45.0 | 40.6 | 35.3 | 31.6 |
| Mole percent styrne in polymer | 0.0 | 5.6 | 10.4 | 16.3 | 20.1 |

EXAMPLE XXI 7.0 parts of butadiene-1,3, 3.6 parts of styrene and 8.5 parts of vinylidene cyanide are dissolved in 126 parts of benzene. 0.2 part of alpha, alpha'-(azodiisobutyronitrile) are then added to the solution and the resulting mixture is heated for 4 hours at 40° C. whereupon a 74.4% conversion to tripolymer is obtained. The tripolymer can be melt spun into excellent mono-filaments and cast into tough films.

EXAMPLES XXI TO XXVI

A master solution is prepared by dissolving 16.6 parts butadiene-1,3, 8.4 parts styrene and 19.8 parts vinylidene cyanide in 281 parts of benzene. Varying quantities of sulfur dioxide and organic mercaptan are then added to 45 part samples of the master solution at room temperature whereupon polymerization occurs to form a useful tripolymer. The recipes are recorded in Table 6.

Table 6

| Example | XXII | XXIII | XXIV | XXV | XXVI |
|---|---|---|---|---|---|
| Parts master solution | 45 | 45 | 45 | 45 | 45 |
| Parts SO$_2$ | 0.0 | 0.16 | 0.04 | 0.16 | 0.16 |
| Parts benzenethiol | .94 | 0.0 | 0.0 | .94 | 1.8 |
| Parts tert. butylithiol | 0.0 | 0.0 | 0.7 | 0.0 | 0.0 |
| Polymerization time (Hrs.) | 43.0 | 18.0 | 43.0 | 19.0 | 19.0 |
| Percent conversion to polymer | 23 | 96.0 | 90.0 | 97.8 | 95.8 |

EXAMPLES XXVII AND XXVIII

Tripolymers of vinylidene cyanide, isoprene and styrene are prepared according to the following recipes:

| Example | XXVII | XXVIII |
|---|---|---|
| Mole percent vinylidene cyanide | 50 | 50 |
| Mole percent isoprene | 25 | 40 |
| Mole percent styrene | 25 | 10 |
| Parts benzene | 30 | 30 |
| Parts 10% para-thiocresol solution in benzene | 1.6 | 1.6 |
| Parts saturated HCl solution in benzene | 4.0 | 4.0 |
| Parts cumene hydroperoxide | 0.1 | 0.1 |
| Parts ½% SO$_2$ solution in benzene | 0.8 | 0.8 |

The above mixtures were maintained at 0° C. for 22 hours and conversions in excess of 70% are obtained. The tripolymer of Example XXVII softens at 120–125° C., is soluble in acetone and is molded into a tough, transparent film. The tripolymer of Example XXVIII softens at 130°–135° C. and is soluble in acetone.

EXAMPLE XXIX 14.7 mole per cent butadiene-1,3, 15.0 mole per cent vinylidene cyanide and 70.3 mole per cent acrylonitrile are admixed and polymerized as in Examples XXVII and XXVIII. The resulting polymer is a hard, resinous, non-rubbery material which melts at about 270° C.

EXAMPLE XXX

To a mixture of 16.7 parts of vinylidene cyanide, 223 parts of vinyl acetate and 13.2 parts of butadiene-1,3 are added 0.38 part of o, o'-dichlorobenzoyl peroxide and 12 parts of dodecyl mercaptan. The resulting mixture is then heated at 40° C. for approximately two hours, at the end of which time a 67 per cent conversion of vinylidene cyanide monomer to polymer has occurred. The resulting interpolymer melts at 258°–260° C. and cold draws readily to give colorless filaments having a tensile strength of 60,000 pounds per square inch.

From the foregoing description of the invention it will be seen that the interpolymers of the present invention constitute a new and useful class of polymeric materials. It is apparent, therefore, that various embodiments of the invention, in addition to those specifically disclosed, may be provided without departing from the spirit and scope of the invention as defined in the appended claims.

We claim:

1. An interpolymer comprising vinylidene cyanide copolymerized with a conjugated aliphatic diene and another monoolefinic monomer copolymerizable with vinylidene cyanide, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

2. An interpolymer comprising vinylidene cyanide copolymerized with a conjugated aliphatic diene and another monoolefinic monomer having a single $CH_2=C<$ group, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

3. A tripolymer of vinylidene cyanide, butadiene-1,3 and styrene, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

4. A tripolymer of vinylidene cyanide, butadiene-1,3 and isobutylene, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

5. An interpolymer comprising vinylidene cyanide copolymerized with a conjugated aliphatic diene and a halogenated monoolefinic monomer having a single $CH_2=C<$ group, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

6. A tripolymer of vinylidene cyanide, butadiene-1,3 and o-chlorostyrene, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

7. An interpolymer comprising vinylidene cyanide copolymerized with a conjugated aliphatic diene and a monoolefinic ester having a single $CH_2=C<$ group, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

8. An interpolymer comprising vinylidene cyanide copolymerized with a conjugated aliphatic diene and a vinyl ester of an aliphatic monocarboxylic acid, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

9. A tripolymer of vinylidene cyanide, butadiene-1,3 and vinyl acetate, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

10. An interpolymer comprising vinylidene cyanide copolymerized with a conjugated aliphatic diene and a monoolefinic nitrile, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

11. A tripolymer of vinylidene cyanide, butadiene-1,3 and acrylonitrile, the vinylidene cyanide component being derived from monomeric vinylidene cyanide which is a crystalline solid at 0° C., having a melting point when in purest form of substantially 9.0° C. to 9.7° C., and being characterized chemically by the ability to undergo on contact with water at room temperature an instantaneous homopolymerization reaction to give a solid water-insoluble resin, said interpolymer containing substantially 50 mole per cent copolymerized vinylidene cyanide.

12. The method which comprises mixing together monomeric vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a solid water-insoluble resin, a conjugated aliphatic diene and another monoolefinic monomer copolymerizable with vinylidene cyanide, and adding a polymerization catalyst whereupon polymerization occurs to form an interpolymer of the monomeric components, said interpolymer containing substantially 50 mole per cent copolymerized vinylidene cyanide.

13. The method which comprises dissolving in a liquid aromatic hydrocarbon vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a solid water-insoluble resin, a conjugated aliphatic diene and a monomeric monoolefinic monomer having a single $CH_2=C<$ group, and adding a polymerization catalyst whereupon polymerization occurs to form an interpolymer of the monomeric components, said interpolymer containing substantially 50 mole per cent copolymerized vinylidene cyanide.

14. The method of claim 13 wherein the conjugated aliphatic diene is butadiene-1,3 and the monoolefinic monomer is styrene.

15. The method of claim 13 wherein the liquid aromatic hydrocarbon is benzene.

16. The method which comprises dissolving in a liquid aromatic hydrocarbon vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a solid water-insoluble resin, a conjugated aliphatic diene and a monomeric halogenated monomer having a single $CH_2=C<$ group, and adding a polymerization catalyst whereupon polymerization occurs to form an interpolymer of the monomeric components in said liquid aromatic hydrocarbon, said interpolymer containing substantially 50 mole per cent copolymerized vinylidene cyanide.

17. The method of claim 16 wherein the conjugated aliphatic diene is butadiene-1,3 and the monomeric halogenated monomer is o-chlorostyrene.

18. The method which comprises dissolving in a liquid aromatic hydrocarbon vinylidene cyanide which is a liquid at room temperature and a crystalline solid at 0° C., having a melting point when in purest form of substantially 9.0° C. to 9.7° C., and is characterized chemically by the ability to undergo on contact with water at room temperature an instantaneous homopolymerization reaction to give a solid water-insoluble resin, a conjugated aliphatic diene and a monoolefinic ester having a single $CH_2=C<$ group, adding a polymerization catalyst whereupon polymerization occurs to form an interpolymer of the monomeric components in the liquid aromatic hydrocarbon, said interoplymers containing substantially 50 mole per cent copolymerized vinylidene cyanide.

19. The method of claim 18 wherein the conjugated aliphatic diene is butadiene-1,3 and the monomeric ester is vinyl acetate.

20. The method of claim 18 wherein the liquid aromatic hydrocarbon is benzene.

References Cited in the file of this patent

UNITED STATES PATENTS 2,466,395    Dickey _____ Apr. 5, 1949